United States Patent
Brier et al.

(10) Patent No.: US 7,856,099 B2
(45) Date of Patent: Dec. 21, 2010

(54) SECURE DATA TRANSMISSION BETWEEN TWO MODULES

(75) Inventors: Eric Brier, La Ciotat (FR); Jacques Fournier, La Ciotat (FR); Pascal Moitrel, Aubagne (FR); Olivier Benoit, Aubagne (FR); Philippe Proust, Marseilles (FR)

(73) Assignee: Gemalto SA, Meudon (FR)

( * ) Notice: Subject to any disclaimer, the term of this patent is extended or adjusted under 35 U.S.C. 154(b) by 1195 days.

(21) Appl. No.: 10/557,904

(22) PCT Filed: May 14, 2004

(86) PCT No.: PCT/EP2004/050815

§ 371 (c)(1),
(2), (4) Date: Jun. 14, 2006

(87) PCT Pub. No.: WO2004/105304

PCT Pub. Date: Dec. 2, 2004

(65) Prior Publication Data

US 2007/0055868 A1    Mar. 8, 2007

(30) Foreign Application Priority Data

May 22, 2003    (FR) .................................. 03 06183

(51) Int. Cl.
*H04K 1/00*    (2006.01)
*H04L 9/00*    (2006.01)
*H04L 9/28*    (2006.01)

(52) U.S. Cl. .......................... 380/28; 713/168; 713/187; 380/44; 714/777

(58) Field of Classification Search .................... 380/28
See application file for complete search history.

(56) References Cited

U.S. PATENT DOCUMENTS 6,510,518 B1 *    1/2003    Jaffe et al. .................. 713/168

OTHER PUBLICATIONS

Fu et al., "On the Error-Detecting Abilites of Binary Constant Weight Codes", IEEE, 1997, p. 457.*
Brier et al., "Correlation Power Analysis with a Leakage Model", CHES 2004, pp. 16-29.*
Fang-Wei Fu et al., "On the Error-Detecting Abilities of Binary Constant Weight Codes", IEEE, Ulm, Germany, Jun. 29-Jul. 4, 1997 p. 457.
Jean-Francois Dhem, "Hardware and Software Symbiosis Helps Smart Card Evolution", IEEE, vol. 21, No. 6, Nov. 2001, pp. 14-25.
Santiago Fernandez-Gomez et al., "Concurrent Error Detection in Block Ciphers", Proceedings International Test Conference 2000, IEEE, pp. 979-984.
Mao-Chao Lin, "Some Results on Quasi-systematic Constant Weight Codes", IEEE, Jun. 24, 1991, pp. 137.

* cited by examiner

*Primary Examiner*—Michael Pyzocha
*Assistant Examiner*—Shewaye Gelagay
(74) *Attorney, Agent, or Firm*—Buchanan, Ingersoll & Rooney, PC

(57) ABSTRACT

The invention relates to a method for secure data transmission in connections between two functional modules of an electronic unit. A first module of a message of k bits in a word code of n bits is injection coded with a constant Hamming weight of w. The word of code is transmitted to a second module. An error signal is generated when the Hamming weight of the word of code of n bits, received by the second module, is different from w. In the absence of error, the code word is decoded, where k, w and n are whole numbers. The invention further relates to a corresponding electronic circuit.

22 Claims, 2 Drawing Sheets

| V | $M_3$ | $M_2$ | $M_1$ | $M_0$ | $C_5$ | $C_4$ | $C_3$ | $C_2$ | $C_1$ | $C_0$ |
|---|---|---|---|---|---|---|---|---|---|---|
| 0 | 0 | 0 | 0 | 0 | 0 | 1 | 0 | 1 | 0 | 1 |
| 1 | 0 | 0 | 0 | 1 | 0 | 0 | 0 | 1 | 1 | 1 |
| 2 | 0 | 0 | 1 | 0 | 0 | 0 | 1 | 0 | 1 | 1 |
| 3 | 0 | 0 | 1 | 1 | 0 | 0 | 1 | 1 | 0 | 1 |
| 4 | 0 | 1 | 0 | 0 | 0 | 1 | 0 | 0 | 1 | 1 |
| 5 | 0 | 1 | 0 | 1 | 0 | 1 | 0 | 1 | 1 | 0 |
| 6 | 0 | 1 | 1 | 0 | 0 | 1 | 1 | 0 | 0 | 1 |
| 7 | 0 | 1 | 1 | 1 | 0 | 1 | 1 | 1 | 0 | 0 |
| 8 | 1 | 0 | 0 | 0 | 1 | 0 | 0 | 0 | 1 | 1 |
| 9 | 1 | 0 | 0 | 1 | 1 | 0 | 0 | 1 | 1 | 0 |
| 10 | 1 | 0 | 1 | 0 | 1 | 0 | 1 | 0 | 0 | 1 |
| 11 | 1 | 0 | 1 | 1 | 1 | 0 | 1 | 1 | 0 | 0 |
| 12 | 1 | 1 | 0 | 0 | 1 | 1 | 0 | 0 | 1 | 0 |
| 13 | 1 | 1 | 0 | 1 | 1 | 1 | 0 | 1 | 0 | 0 |
| 14 | 1 | 1 | 1 | 0 | 1 | 1 | 1 | 0 | 0 | 0 |
| 15 | 1 | 1 | 1 | 1 | 1 | 0 | 1 | 0 | 1 | 0 |

SECURE DATA TRANSMISSION BETWEEN TWO MODULES

This disclosure is based upon French Application No. 0306183, filed May 22, 2003 and International Application No. PCT/EP2004/050815, filed May 14, 2004, the contents of which are incorporated herein by reference.

BACKGROUND OF THE INVENTION

The present invention relates to a method of securely implementing a functional module in an electronic component.

The invention also relates to the corresponding electronic component.

The term "functional module" is used to designate a hardware module dedicated to executing a function that can be an algorithm, said hardware module being included in an electronic component; it can also be a software module constituted by a program for performing a function that can be an algorithm, said software module being implemented in an electronic component.

Such components are used, in particular, in applications in which access to services or to data is strictly controlled, such as cryptography applications.

Such a component has a programmable architecture formed around a microprocessor and memories, including a non-volatile memory that contains one or more items of secret data; it is a general architecture suitable for executing any algorithm. Such a component can also be supplemented by a "hardware" architecture, i.e. an architecture having one or more co-processors dedicated to executing specific computations or to executing a single algorithm, and that offers the advantage of executing the algorithm more rapidly than a software architecture does.

For example, when the algorithm is the secret-key cryptography algorithm known as the "Data Encryption Standard" (DES) which can be used to encrypt a message, execution is in the range 1000 times faster to 10,000 times faster than when it is performed by a co-processor.

Such components are used in computer systems that can be on-board or otherwise. In particular, they are used in smart cards, for certain applications thereof. For example, such applications are database access applications, banking applications, mobile telephone applications including, for example, SIM cards, remote payment applications, e.g. for television channels, gasoline dispensing, or indeed going through highway turnpikes.

Such components or such cards thus implement a cryptography algorithm for encrypting, authenticating, or digitally signing a message when said message must remain confidential.

On the basis of such a message as input into the card by a host system (server, automatic teller, etc.) and of secret numbers contained in the card, the card sends back to the host system said encrypted message, as authenticated or signed, thereby making it possible, for example, for the host system to authenticate the component or the card, or to interchange data.

The characteristics (i.e. the computations performed, and the parameters used) of the encryption algorithms can be known. The only unknown quantity is the secret number(s). The entire security of such algorithms lies in said secret number(s) contained in the card and unknown to the world outside the card. The secret number cannot be deduced merely by knowledge of the message as input and of the encrypted message as sent back. The mathematical security of the encryption algorithms can be increased by using secret numbers of large size, so that the theoretical computation time for computing said keys is too long for present-day computing means.

Unfortunately, it has appeared that external attacks based on physical magnitudes that can be measured outside the component while said component is running the cryptography algorithm, make it possible for dishonest third parties to find the secret number(s) or the secret data contained in said card. Such attacks are known as "side channel attacks". The physical signals used are, in particular, the temperature, electromagnetic radiation, electricity consumption, or computing time of the component.

Among such side channel attacks, mention can be made of Single Power Analysis (SPA) attacks which are based on one or possibly a few measurements, and of Differential Power Analysis (DPA) attacks which are based on statistical analyses resulting from numerous measurements. Such attacks make use, for example, of the fact that the consumption of current by the microprocessor and/or by the co-processor executing the instructions varies depending on the instruction or the data being handled.

Methods of attack by injecting faults have also been developed. Such methods comprise, inter alia, bombarding the component with laser or with light, generating interference electromagnetic fields, injecting voltage peaks into the power supply of the component, or injecting an atypical clock signal or "clock glitching". The effect of such faults is to corrupt the target portions in the execution of the cryptographic algorithm, which then makes it possible to retrieve the secret key mathematically.

In order to counter fault injection attacks, a first alternative is to protect the component or the smart card with screens. The screens can prove to be insufficient: they can, in particular be by-passed or present sensitivity that is too low to guarantee effective protection.

A second alternative for protecting a component or a smart card is to used sensors serving to deactivate the circuit in the event of attack. When a fault injection attack is detected, it is possible either to inhibit the circuit or to prevent the fraudster from carrying out illegal operations.

The "multi-rail" encoding method is known, in particular, for detecting fault injections and for not delivering any information by current measurement. The "dual rail" (DR) encoding method is a particular case of multi-rail encoding. In the DR method, the communications channel uses two communications connections per bit to be encoded. A 0 can thus be encoded by the combination 1-0 on the two communications connections, and a 1 can be encoded by the combination 0-1 on said connections. The Hamming weight of the encoding words is thus always constant, regardless of the sequence of bits processed. Detection of a code word having a combination 1-1 or 0-0 on a pair of connections is associated with a fault.

Furthermore, dual rail is often associated with the following method: between two code words, the combinations go transiently through the state 0-0. Fluctuations in the Hamming distance between the successive combinations can then be made constant. Thus, the electricity consumption for each pair is identical over time. Reading consumption of current then no longer gives any information usable for deducing the secret numbers or the secret data.

In particular, that solution suffers from the drawback of requiring a number of connections that is twice as large as the number of bits of data that are handled.

SUMMARY OF THE INVENTION

The invention claimed solves that drawback. The invention thus provides a method of transmitting data in secure manner over connections between first and second functional modules of an electronic component, said method being characterized in that it comprises the following steps:
- injective encoding by the first module of a message of k bits into a code word of n bits presenting a constant Hamming weight of w;
- transmitting the n-bit code word to the second module;
- generating an error signal when the Hamming weight of the n-bit code word received by the second module is different from w; and
- decoding the code word received in the absence of error signals;
- k, w, and n are integer numbers verifying following relationships:

$2^k \leq C_n^w$, and $3 \leq k < n < 2*k$.

In a variant, ABS $(2w-n) \leq 1$, where ABS designates the absolute value function.

In another variant, the method further comprises a step of generating an error signal when a code word received presenting a Hamming weight w does not correspond to any message.

In another variant, k=4 and n=6.

In yet another variant, the encoding is almost systematic.

Provision is further made for the encoding is dynamic.

In another variant, transmission of data words is made secure over connections between first and second functional modules of an electronic component, a data word being made up of a plurality of parallel k-bit messages, said method being characterized in that, in parallel, the above-defined steps are performed for all of the messages of a given word.

The invention also provides an electronic circuit comprising:
- a first module having an outlet bus for a message of k bits, and an encoder injectively encoding the k-bit message into a code word of n bits presenting a constant Hamming weight of w; and
- a second module having:
- a decoder having n communications connections with the encoder, and for decoding a received n-bit code word into a k-bit message;
- an inlet bus receiving the messages from the decoder; and
- a generator circuit connected to the decoder and generating an error signal when the Hamming weight of a received code word differs from w; and
- k, w, and n are integer numbers verifying following relationships:

$2^k \leq C_n^w$, and $3 \leq k < n < 2*k$.

In a variant, the error signal generator circuit generates an error signal when the received code word does not correspond to any message.

In yet another variant, k=4 and n=6.

In another variant, the encoder and the decoder each have a dynamic encoding multiplexer.

In yet another variant, said buses of the first and second modules are of the size of a data word made up of b messages of size k, where b is an integer greater than or equal to 2, the first module having b of said encoders connected in parallel with its bus, the second module having b of said decoders connected in parallel with its bus.

It is also possible to make provision for the encoder to comprise:
- a first layer of logic gates comprising a YES gate and a NO gate for each bit of the input message (M0-M3);
- a second layer of logic gates comprising $2^k$ AND gates having multiple inlets connected to the outlets of the first logic layer so that one and only one AND gate is validated for a given input message; and
- a third layer of logic gates comprising n OR gates having multiple inlets, the outlet of each AND gate being connected to a respective inlet of OR gates so that the output of the OR gates forms the code word presenting the Hamming weight w.

In a variant, the decoder comprises:
- a first layer of logic gates, the inlet of which layer is connected to the outlet of the third layer of logic gates of the encoder, said first layer comprising a YES gate and a NO gate for each bit of the code word received;
- a second layer of logic gates comprising $2^n$ AND gates having multiple inlets connected to the outlets of the first layer of the decoder so that one and only one AND gate is validated for a given received code word; and
- a third layer of logic gates comprising k OR gates having multiple inlets, the outlet of each AND gate corresponding to a valid code word being connected to a respective inlet of OR gates so that the output of the OR gates forms the decoded message.

In yet another variant, the third layer of logic gates of the decoder comprises an additional OR gate having multiple inlets connected to the outlets of the AND gates corresponding to non-valid code words.

The invention also provides a smart card including such an electronic circuit.

Other characteristics and advantages of the present invention will appear more clearly on reading the following description given by way of non-limiting illustrative example and with reference to the following figures, in which:

DETAILED DESCRIPTION

Figures 1, 3:
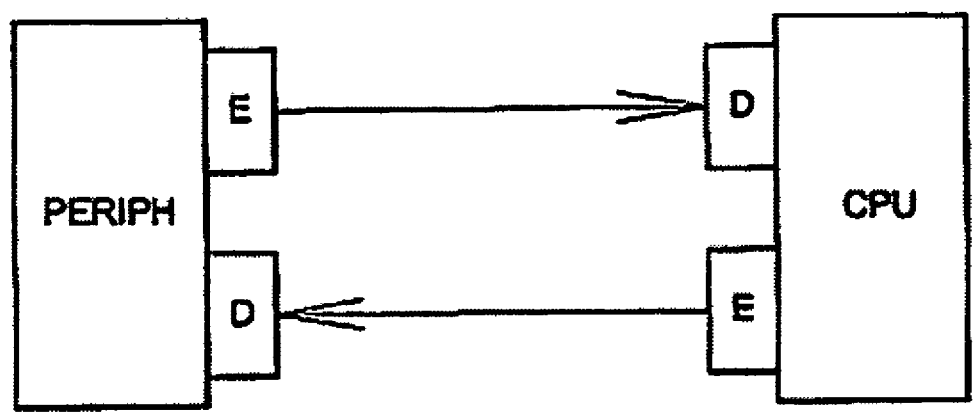
FIG. 1 diagrammatically shows two modules transmitting code words to each other.
FIG. 3 is an example of a conversion table that can be used for the example shown in FIG. 2.

FIG. 1 shows an example of two modules whose communications via a bus must be made secure. In this example, the module CPU corresponds to the processor of a smart card, and the module PERIPH corresponds to a memory or to a co-processor of the smart card. Each module has, at its outlet, an encoder generating a code word on the basis of a message.

At its inlet, each module also has a decoder receiving the code words from the other module, and transforming them into a readable message.

The invention proposes to encode a message or data word with a code word having a defined number of bits that is smaller than the number of bits of the code word used in dual-rail.

The following relationships are used for determining a size n of a code word presenting a constant Hamming weight w that is necessary for encoding a k-bit message whose size is smaller than the code word used in dual-rail:

$2^k \leq C_n^w$, and $3 \leq k < n < 2*k$.

where the function ABS is the absolute value function; and $2^k$ is the number of data messages having k bits.

$C_n^w$ corresponds to the number of code words having n bits with a Hamming weight w. The condition for performing the encoding is for it to be possible to establish an injection between the messages of k bits and code words of n bits. The inequality $2^k \leq C_n^w$ is thus justified.

The maximum number of n-bit words having a weight w is obtained for ABS $(2w-n) \leq 1$ because the maximum number of words available is obtained at the vertex of the graph of the binomial law.

As described in detail above, the present invention offers an advantage for $n \leq 2k$. The size and the complexity of the communications buses between the modules are then reduced.

It can be proved that the encoding is feasible for the greatest possible number of code words, i.e. with n=2k−1 and w=INT (n/2)=k−1, where INT designates the integer portion function.

Since $C_{2k-1}^{k-1} = C_{2k-1}^k$ it suffices to verify the following relationship $C_{2k-1}^k / 2^k \geq 1$ This inequality presents solutions for any value of k greater than or equal to 3, which is demonstrated by recurrence.

The following table compares the minimum numbers n obtained with the numbers of bits used in the dual-rail (DR) method:

| K | N | DR |
|---|---|---|
| 4 | 6 | 8 |
| 8 | 11 | 16 |
| 16 | 19 | 32 |
| 32 | 35 | 64 |

It can thus be observed that the encoding method proposed makes it possible to reduce significantly the number of communications connections compared with the DR method.

In order to reduce the complexity of the printed circuits of the system, the invention is preferably implemented with encoding performed on four-bit bytes or "nybbles". A system implementing encoding in nybbles is presented below with reference to FIGS. 2 and 3.

Figure 2:
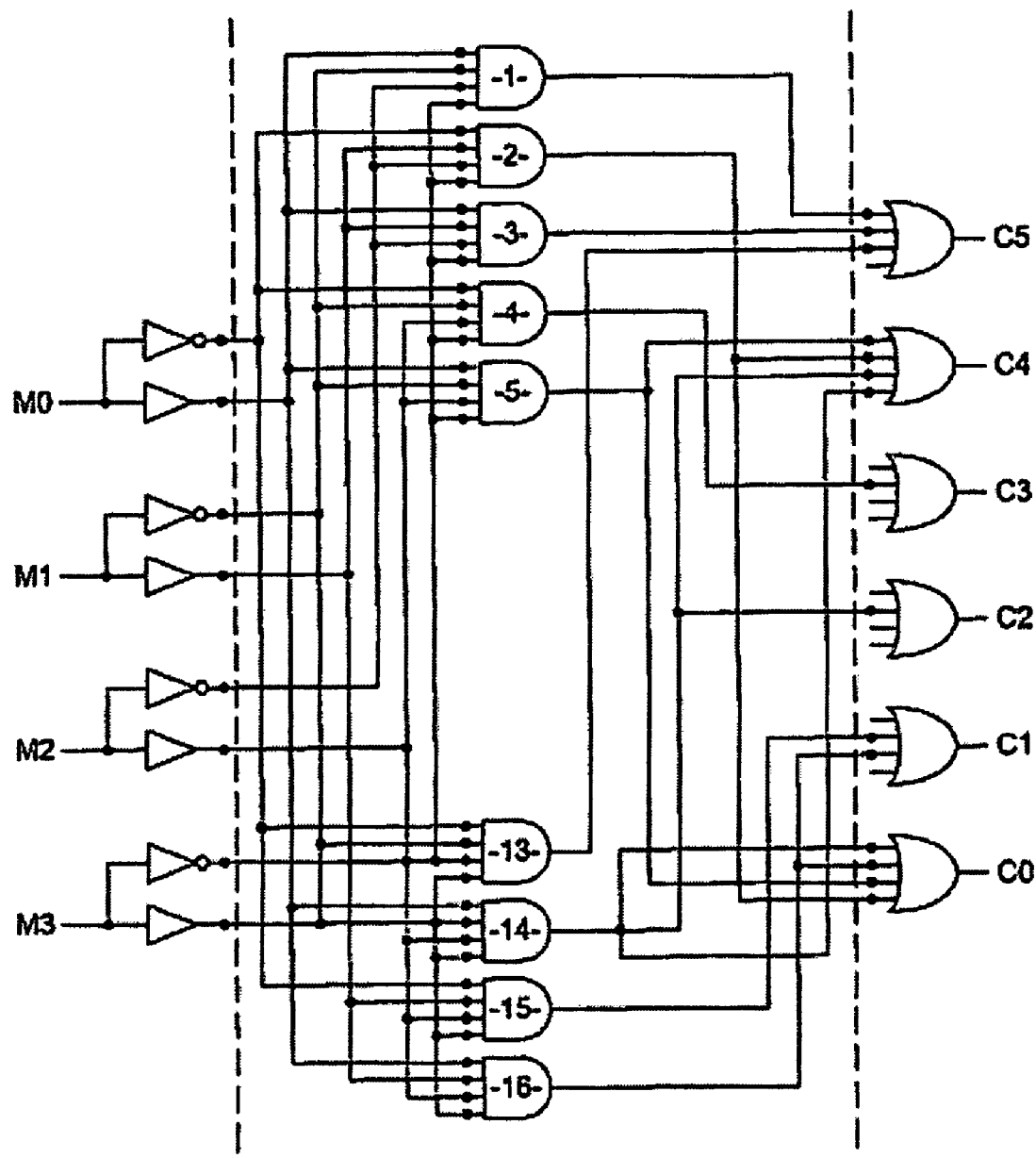
FIG. 2 shows the use of the invention in an encoding circuit for non-linearly encoding a 4-bit byte or "nybble" with a 6-bit code word.

FIG. 2 shows an encoding circuit for encoding a 4-bit message M0 to M3 into a 6-bit code word C0 to C5. This encoder comprises three layers of logic gates.

Each bit M0 to M3 is applied to a respective YES gate and to a respective NO gate. At the outlet of the first layer, each bit thus presents its value and its complement.

The outlets of the first layer are wired to 16 AND gates of the second layer. The 16 AND gates represent the states of the 16 arithmetic values of the nybble M0-M3. The logic gates of the first and the second layer are thus wired so that, for a given value for the nybble M0-M3, a single AND gate of the second layer presents an activation state at the outlet. Thus an AND gate identifies a single nybble.

The outputs of the AND gates are applied to 6 OR gates having multiple inlets (e.g. 16), which form the third layer of the encoding circuit. The wiring between the second and third layers defines the conversion table for the chosen encoding. The circuit shown thus presents permanently-set encoding. In this example, this encoding is non-linear but this is not a requirement for operation of the code. When the outlet of an AND gate presents an activated state, its wiring to the OR gates defines the code word C0-C5 generated at the outlets of the OR gates.

An associated decoding circuit can present a structure that is very similar to the structure of the encoding circuit. It is thus possible to imagine the following decoding circuit having three layers of logic gates.

A first layer has one YES gate and one NO gate per bit of the code word. The first layer thus delivers as output the bits of the code word and their complements.

The outlets of the first layer are connected to 64 6-inlet AND gates of the second layer. Thus one AND gate is associated uniquely with one code word applied to the first layer. Thus, only one AND gate has an outlet activated for a given code word.

Since there are only 16 nybbles in the original message, activation of 48 of the 64 AND gates corresponds manifestly to a fault injection. Thus, 48 AND gates are connected to an OR gate indicating a fault injection attack. This additional OR gate thus generates a signal representing an error corresponding either to a code word presenting a Hamming weight different from w, or to a code word not having any associated message in the conversion table. The connections between the 16 other AND gates and the four remaining OR gates make it possible to retrieve the original message at the outlet of the third layer, by inverting the conversion table of the encoding circuit.

It should be noted that, with three layers, and by using standard components, a propagation time of about 10 nanoseconds (ns) is obtained for the above-described encoder and for the above-described decoder. Thus, said circuits can, for example, be associated with a processor clocked at 50 megahertz (MHz). The use of faster logic gates naturally makes it possible to increase the frequency of the processor.

A person skilled in the art can understand that the wiring between the second and the third layers of the encoder and of the decoder is not necessarily set permanently. For example, it can be imagined for multiplexers to be interposed between the layers, in order to perform dynamic encoding. Naturally, the multiplexers of the encoder and of the decoder are coordinated.

Advantageously, encoding is used that delivers a code that is almost systematic, i.e. a code in which most of the code words verify a systematic code. A systematic code is a code in which each code word is a concatenation of the original message and of redundancy bits. A code word generated in this way is thus relatively easy for the receiver module to decode. Such encoding/decoding makes it possible to simplify the structure of the encoding circuit and of the decoding circuit.

FIG. 3 shows an example of a conversion table that is used for the circuit in FIG. 1. It shows the values for the bits C0-C5 of a code word as a function of the values M0-M3 of the bits of the corresponding message. This code is non-linear. Said code is almost systematic: only two code words are not concatenations of the original message (these code words correspond to the messages 0000 and 1111) and of redundancy bits. The bold characters of the code identify the bits of the original message in each code word.

Naturally, it is possible to attach a plurality of 4-bit systems to any modules processing a number of bits that is multiple of 4, e.g. 8, 16, or 32 bits. In this variant, even if the overall number of bits of the code word is not optimal relative to the above-described table, such a structure having attached nybble encoding systems presents low complexity and is very easy to implement.

Although the number of bits of the code word of the invention is small compared with dual-rail, the protection against various types of fraud is not lessened.

The invention proves itself to offer the same level of performance as the dual-rail method for detecting one-directional fault injection, in which the probability of a bit of the code word switching from 1 to 0 is much higher than the probability of a bit switching from 0 to 1. A one-directional injection is generated, for example, by light pulses or by injecting voltage peaks into a power supply of a module. It should be noted that this mono-directional hypothesis is extremely close to the reality of the response of the circuits to fault injection attacks.

In addition, since the code words transmitted have a constant Hamming weight, they do not make it possible to extrapolate useful information because all of the code words have the same weight. Reading the amount of current consumed by the circuit of the invention therefore does not deliver information about the message either. Thus, the invention guarantees protection similar to dual-rail against power analysis attacks.

The invention is advantageously adapted for transmission between two modules of a smart card. The invention can, in particular, be applied to transmission between the processor and a peripheral memory, or to transmission over a bus inside the processor. The invention can naturally be adapted to transmission over buses of electronic circuits other than those of a smart card.

The invention claimed is:

1. A method of transmitting data in a secure manner over connections between first and second devices, said method comprising the following steps:
   injective encoding, by the first device, a message of k bits into a code word of n bits presenting a constant Hamming weight of w;
   transmitting the n-bit code word to the second device;
   generating, by the second device, an error signal when the Hamming weight of the n-bit code word received by the second device is different from w; and
   decoding, by the second device, the code word received in the absence of error signals;
   wherein:
   k, w, and n are integer numbers verifying the following relationships:

$2^k \leq C_n^w$, and $3 \leq k < n < 2*k$, where $C_n^w$ is the number of code words having n bits with a Hamming weight w.

2. The method according to claim 1, wherein ABS (2w−n) $\leq 1$, where ABS designates the absolute value function.

3. The method according to claim 1, further comprising a step of generating an error signal when a code word received presenting a Hamming weight w does not correspond to any message.

4. The method according to claim 1, wherein k=4 and n=6.

5. The method according to claim 1, wherein the encoding is substantially systematic.

6. The method according to claim 1, wherein the encoding is dynamic.

7. A method of transmitting data words in a secure manner over connections between first and second functional devices of an electronic component, a data word being made up of a plurality of parallel k-bit messages, wherein, in parallel, steps according to claim 1 are performed for all of the messages of a given word.

8. An electronic circuit comprising:
   a first module having an outlet bus for a message of k bits, and an encoder injectively encoding the k-bit message into a code word of n bits presenting a constant Hamming weight of w;
   a second module having:
   a decoder having n communications connections with the encoder, for decoding a received n-bit code word into a k-bit message;
   an inlet bus receiving the messages from the decoder; and
   a generator circuit connected to the decoder and generating an error signal when the Hamming weight of a received code word differs from w;
   wherein k, w, and n are integer numbers verifying the following relationships:

$2^k \leq C_n^w$, and $3 \leq k < n < 2*k$, where $C_n^w$ is the number of code words having n bits with a Hamming weight w.

9. The electronic circuit according to claim 8, wherein the generator circuit generates an error signal when the received code word does not correspond to any message.

10. The electronic circuit according to claim 8, wherein k=4 and n=6.

11. The electronic circuit according to claim 8, wherein the encoder and the decoder each have a dynamic encoding multiplexer.

12. The electronic circuit according to claim 8, wherein said buses of the first and second modules are of the size of a data word made up of b messages of size k, where b is an integer greater than or equal to 2, the first module having b of said encoders connected in parallel with its bus, the second module having b of said decoders connected in parallel with its bus.

13. The electronic circuit according to claim 8, wherein the encoder comprises:
   a first layer of logic gates comprising a YES gate and a NO gate for each bit of the input message;
   a second layer of logic gates comprising $2^k$ AND gates having multiple inlets connected to the outlets of the first logic layer so that one and only one AND gate is validated for a given input message; and
   a third layer of logic gates comprising n OR gates having multiple inlets, the outlet of each AND gate being connected to a respective inlet of the OR gates so that the output of the OR gates forms the code word presenting the Hamming weight w.

14. The electronic circuit according to claim 13, wherein the decoder comprises:
   a first layer of logic gates, the inlet of which layer is connected to the outlet of the third layer of logic gates of the encoder, said first layer comprising a YES gate and a NO gate for each bit of the code word received;

a second layer of logic gates comprising $2^n$ AND gates having multiple inlets connected to the outlets of the first layer of the decoder so that one and only one AND gate is validated for a given received code word; and a third layer of logic gates comprising k OR gates having multiple inlets, the outlet of each AND gate corresponding to a valid code word being connected to a respective inlet of the OR gates so that the output of the OR gates forms the decoded message.

15. An electronic circuit according to claim 14, wherein the third layer of logic gates of the decoder comprises an additional OR gate having multiple inlets connected to the outlets of the AND gates corresponding to non-valid code words.

16. A smart card including an electronic circuit according to claim 8.

17. A module including a processor and memory device, said memory device including program instructions that, when executed by the processor, cause to the module to:

receive a message of k bits transmitted from a second module over a communication link, said message being injectively encoded by the second module into a code word having n bits to present a constant Hamming weight of w;

generate, by the processor, an error signal when the Hamming weight of the n-bit code word received is different from w; and decode, by the processor, the code word received in the absence of error signals;

wherein:

k, w, and n are integer numbers verifying the following relationships:

$2^k \leq C_n^w$, $3 \leq k < n < 2*k$, and $C_n^w$ is the number of code words having n bits with a Hamming weight w.

18. The module according to claim 17, wherein ABS (2w−n)$\leq$1, where ABS designates the absolute value function.

19. The module according to claim 17, wherein the error signal is generated when the received code word presenting a Hamming weight w does not correspond to any message.

20. The module according to claim 17, wherein k=4 and n=6.

21. The module according to claim 17, wherein the encoding is substantially systematic.

22. The module according to claim 17, wherein the encoding is dynamic.

* * * * *